(12) United States Patent
Johansson

(10) Patent No.: US 12,278,475 B2
(45) Date of Patent: Apr. 15, 2025

(54) RESIDUAL CURRENT CIRCUIT BREAKER WITH TWO SWITCHING DEVICES

(71) Applicant: Blixt Tech AB, Kista (SE)

(72) Inventor: Jan Johansson, Solna (SE)

(73) Assignee: Blixt Tech AB, Kista (SE)

( * ) Notice: Subject to any disclaimer, the term of this patent is extended or adjusted under 35 U.S.C. 154(b) by 112 days.

(21) Appl. No.: 17/781,244

(22) PCT Filed: Oct. 21, 2020

(86) PCT No.: PCT/SE2020/051016
§ 371 (c)(1),
(2) Date: May 31, 2022

(87) PCT Pub. No.: WO2021/112737
PCT Pub. Date: Jun. 10, 2021

(65) Prior Publication Data
US 2022/0416532 A1    Dec. 29, 2022

(30) Foreign Application Priority Data
Dec. 6, 2019    (SE) .................................... 1951407-4

(51) Int. Cl.
*H02H 3/10* (2006.01)
*H02H 1/00* (2006.01)

(52) U.S. Cl.
CPC .......... *H02H 3/105* (2013.01); *H02H 1/0007* (2013.01)

(58) Field of Classification Search
CPC ...... H01H 83/20; H01H 9/542; H02H 1/0007; H02H 3/023; H02H 3/06; H02H 3/07;
(Continued)

(56) References Cited

U.S. PATENT DOCUMENTS

| 3,493,815 A | 2/1970 | Hurtle |
| 5,790,354 A | 8/1998 | Altiti et al. |

(Continued)

FOREIGN PATENT DOCUMENTS

| DE | 617225 C | * | 5/1935 | |
| DE | 19946098 A1 | * | 4/2001 | ............... H02H 3/33 |

(Continued)

OTHER PUBLICATIONS

"Saving Energy by applying IoT management and control", presented at Nuremberg Technical Exhibition 2021.

(Continued)

*Primary Examiner* — Jared Fureman
*Assistant Examiner* — Nicolas Bellido
(74) *Attorney, Agent, or Firm* — Blank Rome LLP

(57) ABSTRACT

A residual current circuit breaker, RCCB, for an electrical circuit. The RCCB comprises a first switching device and a second switching device coupled in series between the power supply and the load. The first switching device is configured to switch into an OFF mode, in which no current is fed to the load, upon detecting that the value of the current fed to the load is larger than a switching current is of the first switching device. The second switching device is configured to switch into an ON mode, in which the load is short cut, upon detecting a leakage of the current i fed to the load. When the load is short cut, there will be a current rush in the circuit which will trigger the first switching device to break the circuit and no current will thereafter flow in the circuit.

15 Claims, 8 Drawing Sheets

(58) Field of Classification Search
CPC ............ H02H 3/08; H02H 3/093; H02H 3/10; H02H 3/105; H02H 3/16; H02H 3/32
See application file for complete search history.

(56) References Cited

U.S. PATENT DOCUMENTS

| | | | | |
|---|---|---|---|---|
| 8,018,697 | B2 * | 9/2011 | Ward | ........................ H02H 3/33 361/48 |
| 8,625,238 | B2 * | 1/2014 | Ritzinger | ............... H02H 3/335 361/42 |
| 12,191,652 | B2 * | 1/2025 | Johansson | ................ H02H 3/08 |
| 2003/0160517 | A1 | 8/2003 | Lo et al. | |
| 2004/0222701 | A1 | 11/2004 | Kugelman | |
| 2007/0262779 | A1 * | 11/2007 | Kirk | ........................ G01R 31/52 324/439 |
| 2011/0309816 | A1 | 12/2011 | Simon et al. | |
| 2012/0087050 | A1 * | 4/2012 | Ritzinger | ............... H02H 3/335 361/42 |
| 2014/0009189 | A1 | 1/2014 | Mauder et al. | |
| 2022/0200262 | A1 * | 6/2022 | Johansson | ................ H02H 3/08 |

FOREIGN PATENT DOCUMENTS

| | | | |
|---|---|---|---|
| EP | 3 392 074 A1 | | 10/2018 |
| GB | 2 159 354 A | | 11/1985 |
| JP | 2009152861 A | * | 7/2009 |
| SE | 1830339 A1 | | 6/2020 |
| SE | 1930377 A1 | | 6/2020 |
| SE | 1951011 A1 | | 4/2021 |
| WO | WO-2023247086 A1 | * | 12/2023 |

OTHER PUBLICATIONS

"Movement detection using PIR sensors", Report for Bamdad Payvar and Marco Walström, Mar. 20, 2015.

* cited by examiner

RESIDUAL CURRENT CIRCUIT BREAKER WITH TWO SWITCHING DEVICES

TECHNICAL FIELD

The invention relates to a residual current circuit breaker for an electrical circuit. The invention also relates to a circuit comprising such a residual current circuit breaker and a corresponding method.

BACKGROUND

Residual current circuit breakers (RCCBs) or residual current devices (RCDs) are well known in the art. Other terms for devices with the corresponding function are ground fault circuit interrupter, ground fault interrupter, appliance leakage current interrupter, and leakage current detection interrupter.

The purpose of such devices such as RCCBs and RCDs is to quickly break or disconnect an electrical circuit to prevent harm to persons from electrical shock when the current is not balanced between the supply conductor and return conductor. A difference between the currents in the supply conductor and return conductor indicates leakage current, which presents a shock hazard.

Usually, RCCBs and RCDs are testable and resettable devices. Mechanical input means such as a test button creates a small leakage condition, and a reset button reconnects the conductors after a fault condition has been cleared.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a residual current circuit breaker, RCCB, for an electrical circuit, wherein the RCCB is configured to being coupled between a power supply and a load of the circuit, and wherein the RCCB comprises a first switching device and a second switching device coupled in series with each other between the power supply and the load; wherein the first switching device is configured to switch into an OFF mode, in which no current is fed to the load, upon detecting that a value of a current i fed to the load is larger than a switching current $i_s$ of the first switching device; and the second switching device is configured to switch into an ON mode, in which the load is short cut, upon detecting a leakage of the current i fed to the load.

The switching current $i_s$ of the first switching device is a current at which the first switching device is switched from the ON-mode to the OFF-mode. The switching current can e.g. be a threshold current value. In an implementation form, the switching current can be dynamically changed to suitable values depending on application. The dynamically change of the switching current can be controlled by a software solution, a hardware solution or a combination of software and hardware, e.g. through one or more control devices. The first switching device can in embodiments be a transistor, such as a field effect transistor (FET), which means that the switching time is much faster than the switching time of mechanical switches.

The RCCB according to the first aspect provides a novel RCCB architecture. When a current leakage is detected a short cut is introduced is the circuit by the second switching device and the load is therefore short cut. This means that the voltage will be zero over the load and no person will be harmed by the current in the circuit. However, when the load is short cut there will be a current rush in the circuit which will trigger the first switching device to break the circuit and no current will thereafter flow in the circuit. The first switching device will break the circuit as the current during the current rush will be higher than the switching current of the first switching device. Also, the breaking of the circuit will mean that no person will be harmed since no current is running in the circuit after the breaking of the circuit.

In an implementation form of a RCCB according to the first aspect, the second switching device is coupled in parallel with the load.

In an implementation form of a RCCB according to the first aspect, the second switching device comprises an electronical switch coupled in parallel with a mechanical switch.

The electronical switch can e.g. be a transistor, such as a field effect transistor (FET), which means that the switching time is much faster than the switching time of the mechanical switch.

Thereby, the electronical switch can switch fast so that no person will be harmed. The mechanical switch will however fulfil regulatory requirements, e.g. stipulated by national law and governmental agencies.

In an implementation form of a RCCB according to the first aspect, the electronical switch is configured to switch into an ON mode, in which the load is short cut, upon detecting the leakage of the current i fed to the load; and simultaneously the mechanical switch is configured to switch into a ON mode, in which the load is short cut, upon detecting the leakage of the current i fed to the load.

In an implementation form of a RCCB according to the first aspect, the electronical switch is configured to switch back into an OFF mode, in which the load is not short cut, after a time period T.

In an implementation form of a RCCB according to the first aspect, the time period T is larger than a switching ON time of the mechanical switch, wherein the switching ON time is the time period for the mechanical switch to switch into the ON mode.

Thereby, the mechanical switch has time to switch into its ON mode before the electronical switch switches back to its OFF mode.

In an implementation form of a RCCB according to the first aspect, the mechanical switch is configured to switch back into an OFF mode, in which the load is not short cut, upon receiving an input of a user.

The user can be a person operating the RCCB. Thereby, regulatory requirements can be fulfilled.

In an implementation form of a RCCB according to the first aspect, the RCCB comprises a current leakage detector configured to measure a first current $i_1$ at a first node of the circuit;

measure a second current $i_2$ at a second node of the circuit; and detecting leakage of the current i fed to the load based on the first current $i_1$ and the second current $i_2$.

In an implementation form of a RCCB according to the first aspect, detecting the leakage of the current i fed to the load comprises detecting that the first current $i_1$ and the second current $i_2$ has different values.

That the first current $i_1$ and the second current $i_2$ has different values can mean that the difference is less than a threshold value. It is also noted that the time aspect may have to be considered when detecting a current leakage. For example, the measured current values used for detecting leakage of current may be integrated over a suitable time period, such as an average value over the time period.

In an implementation form of a RCCB according to the first aspect, the first node is arranged at a supply connector for the load and the second node is arranged at a return connector for the load.

In an implementation form of a RCCB according to the first aspect, the current leakage detector is configured to detect a leakage of direct current and/or an alternating current.

In an implementation form of a RCCB according to the first aspect, the current leakage detector is a Hall sensor.

In an implementation form of a RCCB according to the first aspect, the RCCB comprises at least one control device configured to control at least one of: the first switching device and the second switching device.

The at least one control device can be any of a software solution, a hardware solution or a combination of software and hardware. For example, as a software solution the control means can be implemented in a microcontroller whilst in a hardware solution the control means can be implemented in physical logical circuits. The at least one control device can be coupled with the current leakage detector to receive indications therefrom about leakage and/or non-leakage of current in the circuit.

In an implementation form of a RCCB according to the first aspect, the first switching device is configured to a) switch back from the OFF mode into an ON mode, in which a current i is fed to the load, after a first time interval $T_1$;

A switching time of the first switching device can e.g. be considered as a time from when a switching current of a transistor has been detected until the transistor is set in OFF mode (not conductive anymore). The switching time can be the sum of time for detection of overcurrent (hardware limit reached) plus the switching time of the transistor into the OFF mode. For example, the switching time of the first switching device can be 250 ns or less. The switching time of conventional circuit breakers can be larger than 1 ms. Hence, the switching time of the first switching device is always shorter than the switching time of the conventional circuit breakers which also means that the circuit breaker is faster than the conventional circuit breaker.

An advantage with this implementation form is that due to the fact the switching means switch back from the OFF mode into the ON mode after a first time interval $T_1$ and if the overcurrent situation is of short duration, e.g. inrush current, the circuit will automatically operate at normal mode meaning that the load will work properly.

In an implementation form of a RCCB according to the first aspect, the first switching device is configured to b) switch back into the OFF mode upon detecting that a value of a current i fed to the load is larger than the switching current $i_s$; and repeat steps a) and b) N number of times, where N is a positive integer.

Thereby, a consecutive number of inrush current instances can be handled in the AC case. In the DC case capacitive load can be handled.

In an implementation form of a RCCB according to the first aspect, the first switching device is configured to remain in the OFF mode during a second time interval $T_2$ if steps a) and b) have been repeated the N number of times.

In an implementation form of a RCCB according to the first aspect, the second time interval $T_2$ is larger than the first time interval $T_1$.

According to a second aspect of the invention, the above mentioned and other objectives are achieved with an electrical circuit comprising a power supply arranged to feed a current to at least one load and a RCCB according to any one of the preceding claims, wherein RCCB is coupled between the power supply and the at least one load.

According to a third aspect of the invention, the above mentioned and other objectives are achieved with a method for a RCCB, wherein the RCCB is configured to being coupled between power supply and a load of a circuit, and wherein the RCCB comprises a first switching device and a second switching device coupled in series with each other between the power supply and the load; the method comprising switching the first switching device into an OFF mode, in which no current is fed to the load, upon detecting that a value of a current i fed to the load is larger than a switching current $i_s$ of the first switching device; and switching the second switching device into an ON mode, in which the load is short cut, upon detecting a leakage of the current i fed to the load.

The method according to the third aspect can be extended into implementation forms corresponding to the implementation forms of the RCCB according to the first aspect. Hence, an implementation form of the method comprises the feature(s) of the corresponding implementation form of the RCCB.

The advantages of the methods according to the third aspect are the same as those for the corresponding implementation forms of the RCCB according to the first aspect.

In an implementation form of the method according to the third aspect, the method comprises continuously measuring or monitoring the current fed by the power supply to the load.

In embodiments of the invention, the current is monitored with the use of current monitoring means.

In an implementation form of the method according to the third aspect, the method comprises checking if the measured current is higher than a threshold current of the first switching device, i.e. a switching current of the first switching device.

In an implementation form of the method according to the third aspect, the method comprises checking, upon determining that the measured current is higher than a threshold current of the first switching device, if a maximum number of consecutive overcurrent detections (e.g. inrush current) n has been reached, wherein n is a counter value indicating the number of detected consecutive overcurrent.

In an implementation form of the method according to the third aspect, the method comprises breaking by the first switching device, upon determining that maximum number of consecutive overcurrent detections has not been reached, the circuit during a first time interval $T_1$ and thereafter switches back to its ON mode.

In an implementation form of the method according to the third aspect, the method comprises breaking by the first switching device, upon determining that maximum number of consecutive overcurrent detections has been reached, the circuit during a second time interval $T_2$, where $T_2$ is larger than $T_1$. i.e. $T_2 > T_1$.

In an implementation form of the method according to the third aspect, the value of $T_2$ is dependent on the application of the RCCB.

In an implementation form of the method according to the third aspect, $T_2$ is shorter than or equal to 5 s.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
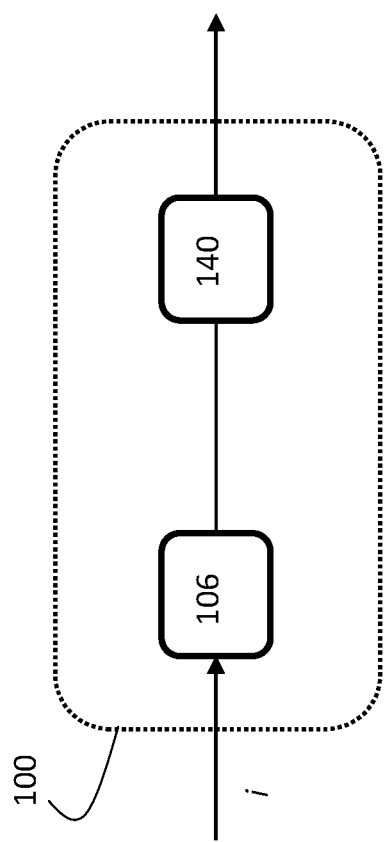
FIG. 1 shows a RCCB according to an embodiment of the invention.

FIG. 1 shows a RCCB 100 according to an embodiment of the invention. According to embodiments of the invention the RCCB 100 is configured to being coupled between a power supply 302 and a load 304 of a circuit 300, see e.g. FIGS. 3a, 3b, 4a, 4b, 5a and 5b. The RCCB 100 comprises a first switching device 106 and a second switching device 140 coupled in series with each other between the power supply 302 and the load 304. The first switching device 106 is configured to switch into its OFF mode, in which no current is fed to the load 304, upon detecting that a value of a current i fed to the load 304 is larger than a switching current $i_s$ of the first switching device 106. The second switching device 140 is configured to switch into its ON mode, in which the load 304 is short cut, upon detecting a leakage of the current i fed to the load 304.

Figure 2:
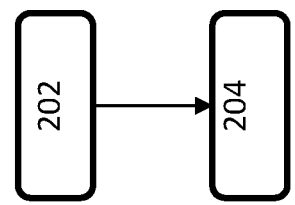
FIG. 2 shows a method according to an embodiment of the invention.

FIG. 2 shows a corresponding method according to an embodiment of the invention which may be implemented in a RCCB 100 such as the one shown in FIG. 1. The method 200 comprises switching 202 the first switching device 106 into an OFF mode, in which no current is fed to the load 304, upon detecting that a value of a current i fed to the load 304 is larger than a switching current $i_s$ of the first switching device 106. The method 200 comprises switching 204 the second switching device 140 into an ON mode, in which the load 304 is short cut, upon detecting a leakage of the current i fed to the 304.

Figure 6A:
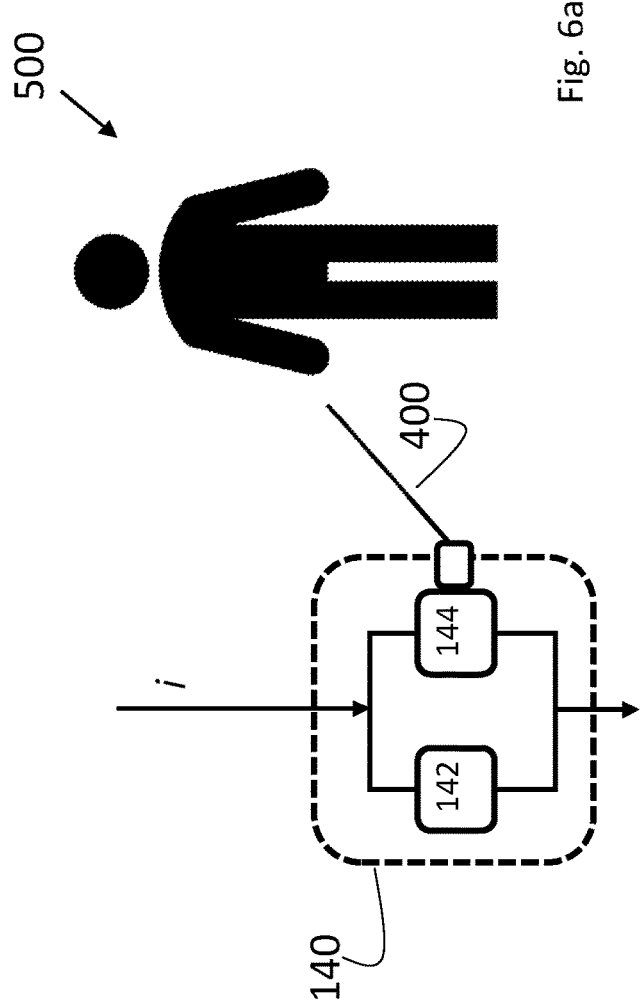
FIG. 6a illustrates a second switching device according to an embodiment of the invention and FIG. 6b illustrates OFF mode and ON mode of switches.
Figure 6B:
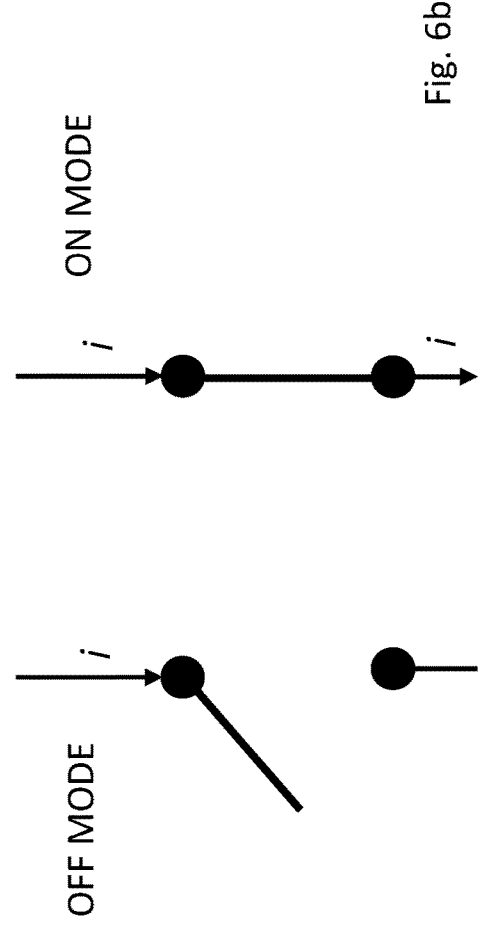

Generally, it can be understood in this disclosure that a switch or switching means or a switching device can take its ON mode and its OFF mode as illustrated in FIG. 6b. In its ON mode the switch is closed so that a current can flow/run through the switch, hence the switch is conductive. In its OFF mode the switch is open and no current can flow/run through the switch.

Figure 3A:
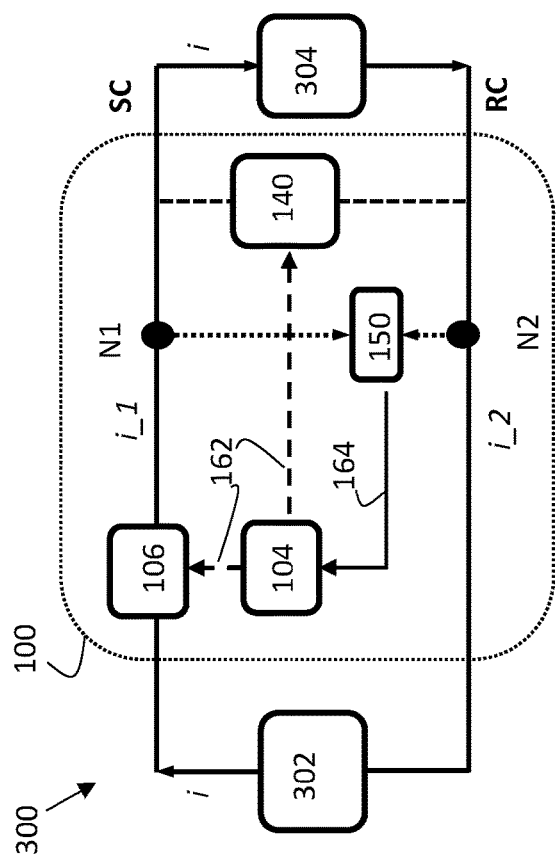
FIGS. 3a and 3b show a RCCB according to a further embodiment of the invention.
Figure 3B:
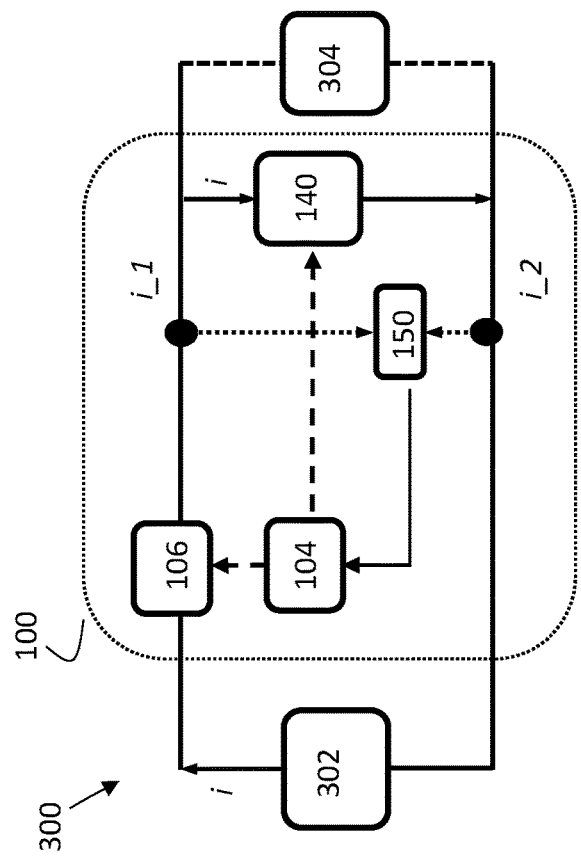

FIGS. 3a and 3b show a RCCB 100 according to a further embodiment of the invention. FIG. 3a illustrate a non-short cut mode of operation of the RCCB 100 and FIG. 3b illustrate a short cut mode of operation of the RCCB 100. In the non-short cut mode of operation the load 304 is not short cut whilst in the short cut mode of operation the load is short cut 304.

With reference to FIG. 3a, a RCCB 100 according to the invention is coupled between the power supply 302 and the load 304 and is part of a circuit 300. The power supply 302 may fed or deliver alternating current (AC) or direct current (DC) to the load 304 depending on application. Only one load 304 is shown in the Figs. but is realized that one or more loads can be part of the circuit 300 and fed with AC or DC current i. Moreover, the first switching device 106 and the second switching device 140 are coupled in series with each other between the power supply 302 and the load 304 as shown in the Figs. Further, the supply conductor SC and the return conductor RC of the load 304 is illustrated. The supply conductor SC and the return conductor RC relate to the flow and direction of the current in the circuit to or from the load 304. In embodiments, the second switching device 140 is coupled in parallel with the load 304 as shown in the Figs.

In FIG. 3a the RCCB 100 further comprises one control device 104 configured to control the first switching device 106 and the second switching device 140 via control lines 162 illustrated with the dashed arrows from the control device 104 to the first switching device 106 and the second switching device 140, respectively. Further, a current leakage detector 150 is part of or comprised in the RCCB 100. The current leakage detector 150 is configured to measure a first current $i_1$ at a first node N1 of the circuit 300 and further configured to measure a second current $i_2$ at a second node N2 of the circuit 300. Based on the first current $i_1$ and the second current $i_2$ the current leakage detector 150 can detect a leakage of the current i fed to the load 304. The first node N1 and the second node N2 can be arranged on each side of the load 304 in relation to the direction of the flow of the current i as illustrated in the Figs.

In embodiments, detecting the leakage of the current i fed to the load 304 comprises detecting that the first current $i_1$ and the second current $i_2$ has substantially different values. A very small difference in value between first current $i_1$ and the second current $i_2$ may be the case without concluding that there is leakage of current due to e.g. measuring faults, hardware limitations etc. Reasons for such deviation may e.g. be due inaccuracies on measurements, hardware limitations, etc. Therefore, a detection interval and/or a threshold value may be used in this respect. For example, if the measured difference is less than the threshold value it is determined that no current leakage is at hand whilst if the measured difference is larger than the threshold value it is determined that current leakage is at hand. Also, the time aspect may have to be considered since the value can fluctuate over time. In this case integration over a suitable timer period may be performed to obtain a value used for determining if there is a leakage of current in the circuit.

The current leakage detector 150 may be configured to detect a leakage of both DC and AC. Hence, in embodiments, the current leakage detector 150 is a Hall sensor.

Further, the current leakage detector 150 is coupled to the control device 104 via communication lines 164 as illustrated with the arrow from the current leakage detector 150 to the control device 104. When the current leakage detector 150 detects a leakage of current the current leakage detector 150 indicates this to the control device 104 via the communication lines 164. For example, a control signal may be transmitted to the control device 104. It is further noted that the current leakage detector 150 also can be configured to indicate when there is no longer a leakage of current, e.g. when the first $i_1$ and second $i_2$ currents have substantially the same value. Also, in this case an interval and/or a threshold value and/or integration can be used to determine if non-leakage of current is at hand.

When no leakage of current is detected, the circuit 300 functions in normal operation and a current i is fed from the power supply 302 to the load 304 as illustrated in FIG. 3*a*. Therefore, there is no current running via the second switching device 140 as illustrated with the dashed lines to and from the second switching device 140.

With reference to FIG. 3*b*, however if a current leakage is detected in the circuit 300 by the current leakage detector 150 an indication of the leakage is sent to the control device 104. Upon receiving the indication of current leakage in the circuit 300, the control device 104 via the control couplings 162 controls the first switching device 106 and the second switching device 140 accordingly. Hence, the control device 104 switches the first switching device 106 into the OFF mode of the first switching device 106, in which no current is fed to the load 304. Further, the control device 104 switches the second switching device 140 into the ON mode of the second switching device 140 in which the load 304 is short cut. This means that the current i in the circuit 300 instead of flow over the load 304 will flow directly through the second switching device 140 as illustrated in FIG. 3*b*. Hence, no current will flow to the load 304 in this case.

Figure 4A:
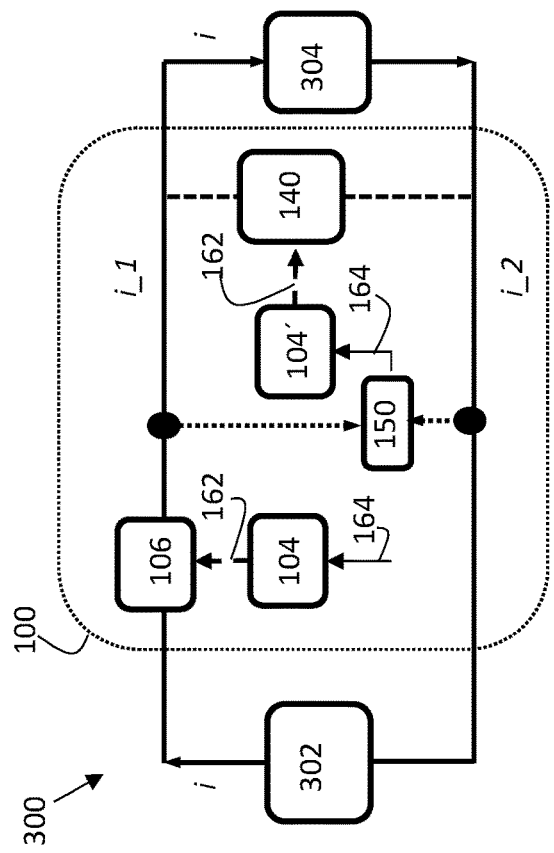
FIGS. 4a and 4b show a RCCB according to a further embodiment of the invention.
Figure 4B:
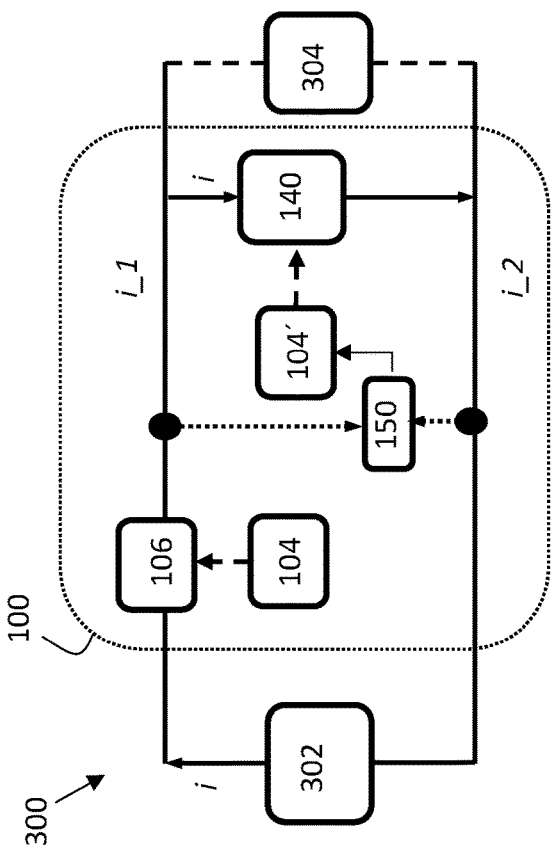

FIGS. 4*a* and 4*b* show a RCCB 100 according to a further embodiment of the invention. FIG. 4*a* illustrate the non-short cut mode and FIG. 4*b* illustrate the short cut mode, respectively. The main difference between the embodiment shown in FIGS. 3*a* and 3*b* to the embodiment shown in FIGS. 4*a* and 4*b* is that in the latter embodiment the RCCB 100 comprises two independent control devices. i.e. 104, 104' instead of one control device. A first control device 104 is coupled to and configured to control the first switching device 106 and a second control device 104' is coupled to and configured to control the second switching device 140. As shown in FIGS. 4*a* and 4*b*, the second control device 104' is also coupled to a current leakage detector 150 via communication line 164. Hence, the interaction between the second control device 104' and the current leakage detector 150 can be as previously described with reference to FIGS. 3*a* and 3*b*.

The first control device 104 may on the other hand be coupled to an overcurrent detecting device (see FIG. 7) via a suitable communication line 166 illustrated with the arrow. When an overcurrent is detected and indicated to the first control device 104 the first switching device 106 is controlled to break the circuit 300. More details about this aspect is disclosed with reference to FIG. 7 below in which the first control device 104 is an integral part of the first switching device 106.

Figure 5A:
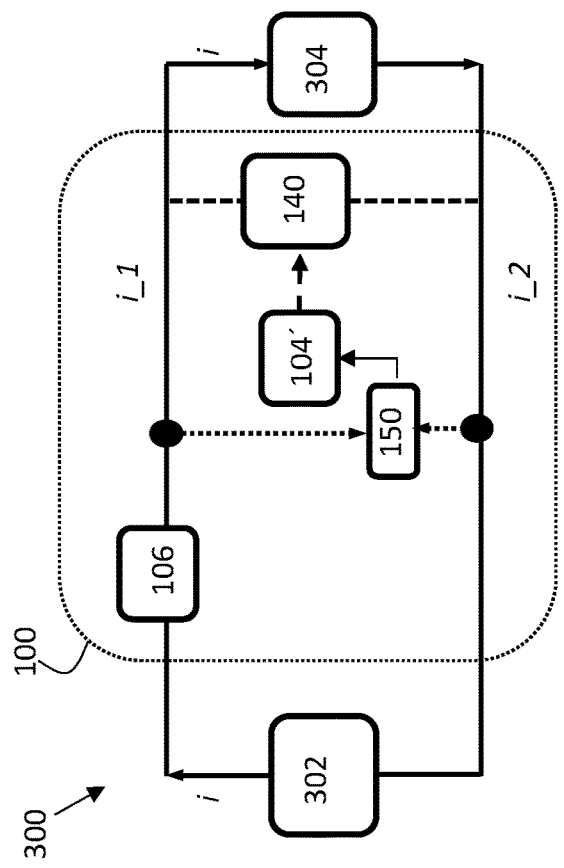
FIGS. 5a and 5b show a RCCB according to a further embodiment of the invention.
Figure 5B:
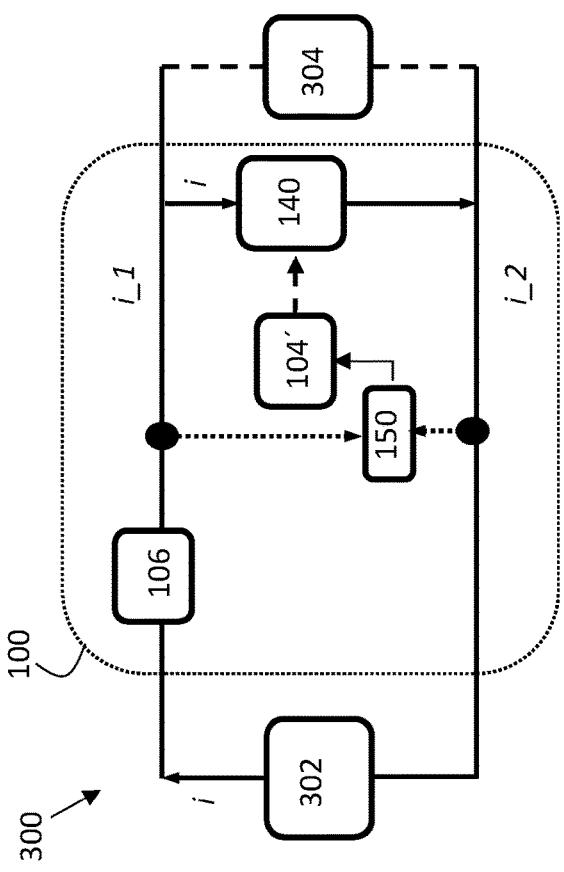

FIGS. 5*a* and 5*b* show a RCCB 100 according to yet a further embodiment of the invention. FIG. 5*a* illustrate the non-short cut mode and FIG. 5*b* illustrate the short cut mode, respectively. The difference of the embodiment shown in FIGS. 5*a* and 5*b* to the previous embodiments in FIG. 3*a*, 3*b*, 4*a* and 4*b* is that the first switching device 106 in this case is a mechanical switch and/or a fuse. Hence, no control device is needed for controlling the first switching device 106. In case of a mechanical switch, said mechanical switch can function and be configured as a mechanical switch of the second switching device 140 which is described with reference to FIG. 6*a* in the following disclosure, i.e. being partially operated by a user 500.

Moreover, FIG. 6*a* illustrates a second switching device 140 according to embodiments of the invention. In this embodiment, the second switching device 140 comprises an electronical switch 142 which is coupled in parallel with a mechanical switch 144. During operation the electronical switch 142 is configured to switch into its ON mode, in which the load 304 is short cut by the electronical switch 142, upon detecting the leakage of the current i fed to the load 304. Simultaneously, the mechanical switch 144 is configured to switch into its ON mode, in which the load 304 is short cut by the mechanical switch 144, upon detecting the leakage of the current i fed to the load 304. In embodiments, the switching ON of the electronical switch 142 and/or the mechanical switch 144 can be controlled by a control device 104; 104' as previously described. The functioning of the OFF mode and ON mode of the electronical switch 142 and the mechanical switch 144 is illustrated in FIG. 6*b*.

Since, the electronical switch 142 has much shorter switching time than the mechanical switch 144, the electronical switch 142 is in embodiments configured to switch back into an OFF mode, in which the load 304 is not short cut by the electronical switch 142, after a time period T. Mentioned time period T is designed to be larger than a switching ON time of the mechanical switch 144. The switching ON time of the mechanical switch 144 is the time period for the mechanical switch 144 to switch into the ON mode from the OFF mode.

As also illustrated in FIG. 6*a*, the mechanical switch 144 is in embodiments configured to switch back into its OFF mode, in which the load 304 is not short cut by the mechanical switch 144 anymore, upon receiving an input of a user 500 which is e.g. a person operating the RCCB 100. The input may be mechanical input means 400, e.g. through a lever, a button or a switch resetting the mechanical switch 144 back into the OFF mode from the ON mode. Therefore, according to this embodiment the mechanical switch 144 must be reset by a user 500 of the RCCB 100.

The electronical switch 142 of the second switching device 140 can on the other hand continue to be controlled by the control device 104; 104' such that each time the control device 104; 104' obtains an indication of current leakage in the circuit the electronical switch 142 is switched into its ON mode and consequently, each time the control device 104; 104' obtains an indication of non-leakage of current in the circuit 300 the electronical switch 142 is switched back into its OFF mode which means that the load 304 is no longer short cut by the electronical switch 142. However, as long as the mechanical switch 144 is not reset the load 304 will continue to be short cut by the mechanical switch 144.

Figure 7:
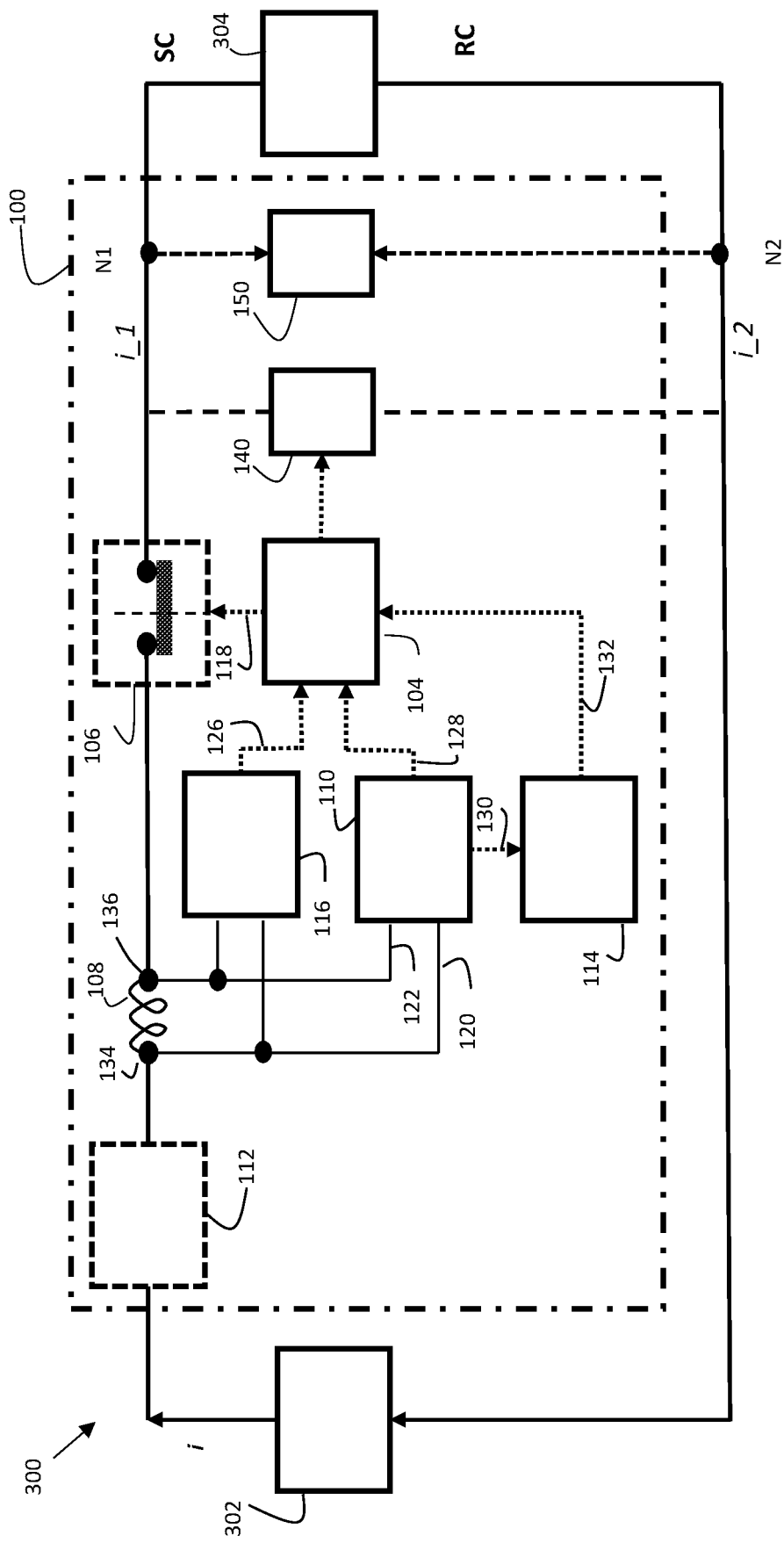
FIG. 7 illustrates a RCCB according to a further embodiment of the invention.

FIG. 7 illustrates embodiments of the invention in which the first switching device 106 is part of a circuit breaker which is part of the RCCB 100 when operating in the non-short cut mode. The circuit breaker is arranged for breaking an electrical circuit 300 such that no current can reach the electrical load 304. Therefore, as previous mentioned the electrical circuit 300 comprises at last one power supply 302 arranged to supply a current i (or a corresponding voltage) to at least one load 304 which means that the power supply 302 is electrically coupled to the load 304. Examples of loads 304 are household appliances but are not limited thereto. Hence, a load in this context relate to an electrical device arranged to consume electrical power for its functioning. The power supply 302 is arranged to supply AC or DC depending on application. The supplied current can e.g. be mains current with nominal voltage of 110V or 220V and with a frequency of 50 Hz. However, the invention is not limited thereto and hence embodiments of the invention can be applied from all types of voltage systems, from low voltage systems to high voltage systems.

When the circuit breaker breaks the circuit 300 no current i can reach the load 304. In this respect the circuit breaker comprises the first switching device 106 arranged to be controlled by control means 104. The first switching device 106 is arranged to switch between its ON mode, in which a current i from the power supply 302 is fed to the load 304, and its OFF mode, in which no current is fed to the load 304. The first switching device 106 hence act as switch closing or opening the circuit. The control means 104 can e.g. be a digital microcontroller previously mentioned but is not limited thereto.

The control means 104 can be configured to obtain a value of the current which is supplied by the power supply and fed to the load 304 and based on the obtained value of the current the control means 104 controls the first switching device 106 accordingly. More specifically, the control means 104 herein can be configured to: a) switch the first switching device 106 into the OFF mode within a switching time of the circuit breaker if a value of the current i is larger than a switching current $i_s$ of the circuit breaker; and b) switch the first switching device 106 from the OFF mode back into the ON mode after a first time interval $T_1$.

The control means 104 can further be configured to repeat steps a) and b) N number of times, where N is a positive integer. If the current i fed to the load 304 is less than the switching current $i_s$ of the circuit breaker during one of the repetitions the switching means can be kept in the ON mode.

With reference to FIG. 7, the circuit breaker comprises current monitoring means 108 configured to continuously monitor the current i fed from the power supply 302 to the load 304, and to provide the value of the monitored current i to the control means 104 through signal coupling 120 and 122 via a threshold detector 110. The monitoring can be performed by the current monitoring means 108 configured to continuously measuring the current fed by the power supply and provide the measured values of the current to the threshold detector 110. In the threshold detector 110 both switching current and breaking current can be checked. If the measured valued is larger than a threshold value for the switching current the threshold detector 110 triggers the control means 104 through signal coupling 128 which results in that the control means 104 switches the first switching device 106 from the ON mode into the OFF mode through control interface 118. The threshold detector 110 is hence configured to trigger the control means 104 when the measured value of the current is larger than the switching current of the circuit breaker 100. However, if the measured current is larger than the breaking current of the circuit breaker the control means 104 will immediately switch the first switching device 106 into the OFF mode so that to components in the circuit breaker is not harmed.

The current monitoring means 108 may be an inductor such as a coil as illustrated in FIG. 7. The function of the coil is to delay overcurrent so that the switching means can be set to OFF mode before electrical components are damaged. The coil has two measurement nodes 134 and 136 which are arranged on different sides of the inductive section of the coil. Hence, both a zero-crossing detector 116 and a threshold detector 110 are in this embodiment arranged to measure the current at the measurement nodes 134 and 136 of the coil. In other words, the current monitoring means 108, or in this case the coil, is connected to zero-crossing detector 116 via coupling 120 to measurement node 134 and coupling 122 to measurement node 136. The zero-crossing detector 116 is herein configured to detect zero-crossings if the current fed from the power supply 302 is AC. Therefore, the zero-crossing detector 116 indicates zero-crossings to the control means 104 through signal means 126 so that the control means 104 can switch back the switching means to ON mode at a zero-crossing. This means that the zero-crossing detector 116 is only relevant for the AC case.

FIG. 7 also shows a delay block 114 which is arranged to provide correct time delays to the control means 104 through signal means 132. For example, in the DC case the first time interval $T_1$ is, in embodiments of the invention, longer than a threshold time interval defining when the current monitoring means 108 has lost substantially all of its stored energy. Hence, in this case the first time interval $T_1$ can be provided to the control means as a delay by the delay block 114. Therefore, the threshold detector 110 can trigger or notify the delay block 114 through signal means 130.

As also shown in FIG. 7, the circuit breaker 100 is coupled in series with another second circuit breaker 112, and where the circuit breaker 100 and the second circuit breaker 112 together are coupled between the power supply 302 and the load 304. In embodiments the second circuit breaker 112 is a so-called standardized circuit breaker, such as a fuse, a two or four pole miniature circuit breaker or any other suitable standardized circuit breaker. An example of a standard for circuit breakers is IEC 60898-1. With a standardised second circuit breaker the circuit breaker will fulfil safety requirements set by national, regional and international governmental bodies and organisations in electrical safety. According to these embodiments, the switching time of the first switching device 106 is less than a switching time of the second circuit breaker 112.

In further embodiments of the invention, a breaking current or switching current of the first switching device 106 is larger than the breaking current of the second circuit breaker 112. The breaking current or switching current of the first switching device 106 is in embodiments at least three times higher than the breaking current of the second circuit breaker 112. For digital circuit breakers the capability of the transistor (switch of the circuit breaker, i.e. in this case the switching 106) to handle peak currents sets the hardware limit for the breaking current. The breaking current of the first switching device 106 can be considered as the hardware limit set to protect the switching means, such as a transistor acting as switches, from overcurrent. The breaking current of the second circuit breaker 112 can be the rated current for the second circuit breaker 112.

Furthermore, the second circuit breaker 112 can be integrated with the RCCB, e.g. arranged inside the same housing and/or on a common PCB. In one case a metal strip corresponding to a fuse is arranged in the common PCB and acts as a second circuit breaker 112. The metal strip would correspond to the thermal trigger of a miniature circuit breaker (MCB).

Figure 8:
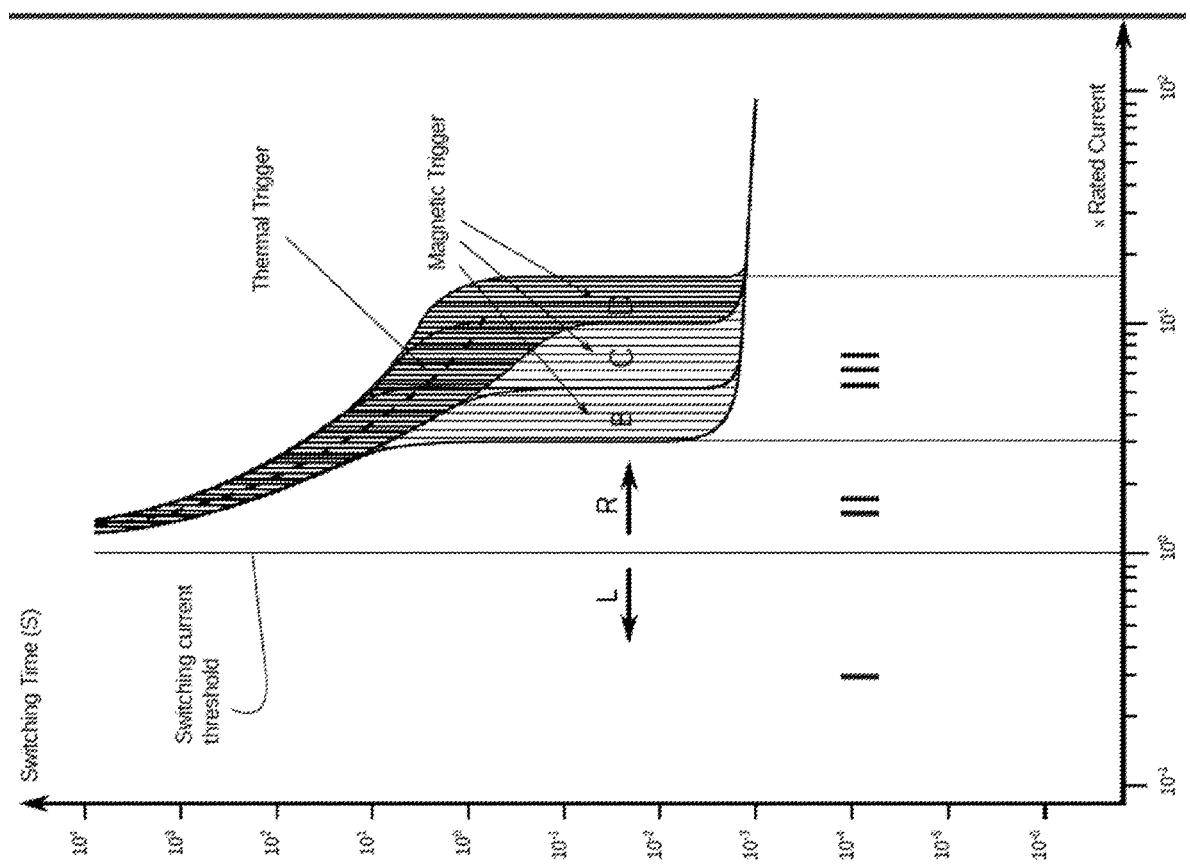
FIG. 8 illustrates the relation between switching time and rated current.

FIG. 8 shows the relation between switching time and rated current in a diagram. The x-axis shows the rated current ("x" times the nominal value given) and the y-axis shows the switching time in seconds. The magnetic trigger zones marked B, C and D in FIG. 8 relate to different standardised rated overcurrent for MCBs. The thermal trigger zone on the other hand relates to heat generated by the energy (i.e. current*time) generated in the MCB.

The vertical line marked and denoted "switching current threshold" demarks zone I and II in FIG. 8. Zone I in FIG. 8 relates to a software defined current limit in relation to the switching current threshold (SCT), and Zone II relates to software defined overcurrent limit in relation to the switching current threshold. In embodiments of the invention, the SCT can be changed or set and controlled by software. This is illustrated with the right R arrow and left L arrow in FIG. 8. This means that when a measured current is over a current SCT the software e.g. in a microcontroller can decide to raise the SCT so that no switching is performed if it is decided that the measured current is not harmful to the circuit breaker itself or to the load. Hence, this situation arises when the measured current is above the current SCT but below the breaking current of the circuit breaker. The reverse case can also happen, i.e. that the SCT is lowered. For example, to save cost (lower tariff) the maximum rated current can be lowered by lowering the SCT. Zone III in FIG. 8 on the other hand relates to hardware defined overcurrent limit which is the same as the breaking current.

As previously stated, embodiments of the invention may relate to a circuit comprising an AC power supply, a DC power supply, or both an AC power supply and a DC power supply. In the following disclosure the different cases of AC and DC will be described more in detail with reference to the flow chart in FIG. 9.

Figure 9:
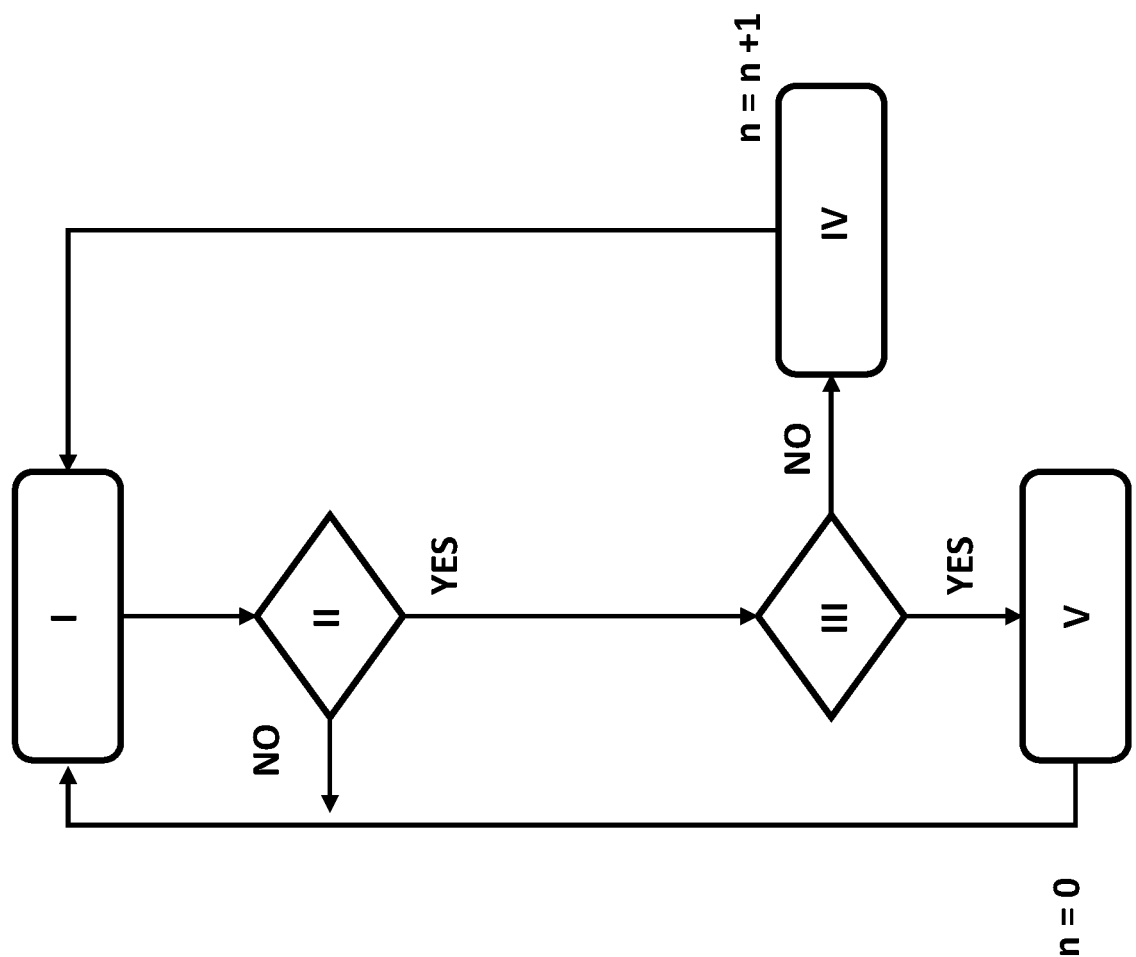
FIG. 9 shows a flow chart of a method for a first switching device.

FIG. 9 shows a flow chart of a method according to the invention which relates to the first switching device 106.

In step I in FIG. 9, the current fed by the power supply 302 to the load 304 is continuously measured or monitored. In embodiments of the invention, the current is monitored with the use of current monitoring means 108 as previously described.

In step II in FIG. 9, it is checked if the measured current is higher than a threshold current of the first switching device 106, i.e. a switching current of the first switching device 106. If NO in step II, i.e. the measured current is below the threshold current, the method returns back to step I and continues to measure the current fed by the power supply 302. However, if YES in step II, i.e. the measured current is higher than the threshold current, and the method continues to step III.

In step III in FIG. 9, it is checked if a maximum number of consecutive overcurrent detections (e.g. inrush current) n has been reached, where n is a counter value indicating the number of consecutive overcurrent detected. If YES in step III, this is equal to if the measured current has been higher than the threshold current N number of times. If NO in step III, the method continues to step IV else if YES in step III the method continues to step V. In embodiments of the invention, N is equal to or less than 10. In further embodiments of the invention, N is equal to or less than 6.

In step IV in FIG. 9, i.e. NO was determined in step III, the first switching device 106 breaks the circuit 300 by switching into its OFF mode during a first time interval $T_1$ and thereafter switches back to its ON mode. The counter n is incremented with value 1, i.e. n=n+1 and the method returns back to step I.

In the AC case when the power supply 302 feds AC to the load, $T_1$ is so designed that the first switching device 106 switches back to its ON mode at a zero-crossing according to embodiments of the invention. Hence, the first time interval $T_1$ is dependent on the zero-crossing of the AC current. The first time interval $T_1$ is e.g. a time interval between two consecutive zero-crossings of the AC current and therefore the next zero-crossing after overcurrent detected. It is noted that the first time interval $T_1$ can vary between consecutive detected overcurrent. Hence, the first time interval $T_1$ can be designed for optimal performance.

In the DC case when the power supply feds DC to the load 304, the first time interval $T_1$ is dependent on an energy storing property of the current monitoring means 108 according to embodiments of the invention. As previously mentioned, said current monitoring means 108 may be an inductor, such as a coil, having an inherent resistance configured to provide the value of the monitored current i fed from the power supply 302 to the load 304. Hence, in embodiments the first time interval $T_1$ is longer than a threshold time interval defining when the current monitoring means 108 has lost substantially all of its stored energy in the DC case.

In step V in FIG. 9, i.e. YES in step III, the first switching device 106 breaks the circuit by switching to its OFF mode during a second time interval $T_2$, where $T_2$ is larger than $T_1$. i.e. $T_2 > T_1$. The counter n is also reset to zero, i.e. n=0 and the method returns back to step I.

In the AC case $T_2$ is so designed that the first switching device 106 switches back to its ON mode at a zero-crossing after a consecutive number of zero-crossings according to embodiments of the invention.

In embodiments of the invention, $T_2$ is designed to be shorter than or equal to 5 s both in the AC and the DC case due to the human perception of electrical fail situations. It is however noted that the parameter $T_2$ can be designed to other values. Hence, the parameter $T_2$ can in embodiments be dynamically adapted to different applications.

Finally, it should be understood that the invention is not limited to the embodiments described above, but also relates to and incorporates all embodiments within the scope of the appended independent claims.

The invention claimed is:

1. A residual current circuit breaker, RCCB, for an electrical circuit, wherein the RCCB is configured to being coupled between a power supply and a load of the electrical circuit, and wherein the RCCB comprises a first switching device and a second switching device coupled in series with each other between the power supply and the load; wherein:
   the second switching device comprises an electronic switch coupled in parallel with a mechanical switch and is configured to switch into an ON mode, in which the load is short cut, upon detecting a leakage of the current i fed to the load and thereby a current rush will occur in the circuit which will trigger the first switching device to switch into an OFF mode, in which no current is fed to the load, upon detecting that a value of a current i fed to the load is larger than a switching current threshold $i_s$ of the first switching device and switch back from the OFF mode into an ON mode, in which a current i is fed to the load, after a first time interval $T_1$.

2. The RCCB according to claim 1, wherein:
   the electronic switch is configured to switch into an ON mode, in which the load is short cut, upon detecting the leakage of the current i fed to the load; and
   the mechanical switch is configured to switch into a ON mode, in which the load is short cut, upon detecting the leakage of the current i fed to the load.

3. The RCCB according to claim 2, wherein the electronic switch is configured to switch back into an OFF mode, in which the load is not short cut, after a time period T.

4. The RCCB according to claim 3, wherein the time period T is larger than a switching ON time of the mechanical switch, wherein the switching ON time is the time period for the mechanical switch to switch into the ON mode.

5. The RCCB according to claim 2, wherein the mechanical switch is configured to switch back into an OFF mode, in which the load is not short cut, upon receiving an input of a user.

6. The RCCB according to claim 1, wherein the RCCB comprises a current leakage detector configured to:
measure a first current $i_1$ at a first node of the electrical circuit;
measure a second current $i_2$ at a second node of the electrical circuit; and
detect leakage of the current i fed to the load based on the first current $i_1$ and the second current $i_2$.

7. The RCCB according to claim 6, wherein detecting the leakage of the current i fed to the load comprises detecting that the first current $i_1$ and the second current $i_2$ have different values.

8. The RCCB according to claim 6, wherein the first node is arranged at a supply connector for the load and the second node is arranged at a return connector for the load.

9. The RCCB according to claim 6, wherein the current leakage detector is configured to detect a leakage of direct current and/or an alternating current.

10. The RCCB according to claim 9, wherein the current leakage detector is a Hall sensor.

11. The RCCB according to claim 1, wherein the RCCB comprises at least one control device configured to control at least one of: the first switching device and the second switching device.

12. A residual current circuit breaker, RCCB, for an electrical circuit, wherein the RCCB is configured to being coupled between a power supply and a load of the electrical circuit, and wherein the RCCB comprises a first switching device and a second switching device coupled in series with each other between the power supply and the load; wherein:
the first switching device is configured to switch into an OFF mode, in which no current is fed to the load, upon detecting that a value of a current i fed to the load is larger than a switching current threshold is of the first switching device, and
the second switching device is configured to switch into an ON mode, in which the load is short cut, upon detecting a leakage of the current i fed to the load,
wherein the first switching device is configured to:
a) switch back from the OFF mode into an ON mode, in which a current i is fed to the load, after a first time interval $T_1$;
b) switch back into the OFF mode upon detecting that a value of a current i fed to the load is larger than the switching current $i_s$; and
repeat steps a) and b) N number of times, where N is a positive integer.

13. The RCCB according to claim 12, wherein the first switching device is configured to remain in the OFF mode during a second time interval $T_2$ if steps a) and b) have been repeated the N number of times.

14. The RCCB according to claim 13, wherein the second time interval $T_2$ is larger than the first time interval $T_1$.

15. A method for a residual current circuit breaker, RCCB, wherein the RCCB is configured to being coupled between power supply and a load of a circuit, and wherein the RCCB comprises a first switching device and a second switching device coupled in series with each other between the power supply and the load, the second switching device comprising an electronic switch coupled in parallel with a mechanical switch; the method comprising:
switching the first switching device into an OFF mode, in which no current is fed to the load, upon detecting that a value of a current i fed to the load is larger than a switching current is of the first switching device; and
switching the second switching device into an ON mode, in which the load is short cut, upon detecting a leakage of the current i fed to the load.

* * * * *